United States Patent [19]
Kurauchi et al.

[11] 3,906,436
[45] Sept. 16, 1975

[54] DETECTION SYSTEM FOR THE LOCATION OF MOVING OBJECTS

[75] Inventors: Noritaka Kurauchi; Kenichi Yoshida; Yoshinobu Kobayashi; Masataka Kuroda, all of Osaka, Japan

[73] Assignee: Sumitomo Electric Industries, Ltd., Osaka, Japan

[22] Filed: Feb. 6, 1974

[21] Appl. No.: 440,217

[30] Foreign Application Priority Data
Feb. 8, 1973 Japan................................ 48-15824
Feb. 8, 1973 Japan................................ 48-15825

[52] U.S. Cl............. 340/23; 246/63 C; 246/122 R; 340/38 L; 340/47
[51] Int. Cl.² ........................................ G08G 1/12
[58] Field of Search .......... 246/63 C, 122 R, 187 B; 340/23, 38 L, 47

[56] References Cited
UNITED STATES PATENTS
| | | | |
|---|---|---|---|
| 3,609,676 | 9/1971 | Charleroi............................. | 340/23 |
| 3,740,549 | 6/1973 | Thorme-Booth................. | 246/122 R |
| 3,786,411 | 1/1974 | Kurauchi et al. ................. | 340/47 X |

*Primary Examiner*—Maynard R. Wilbur
*Assistant Examiner*—Richard E. Berger
*Attorney, Agent, or Firm*—Sughrue, Rothwell, Mion, Zinn & Macpeak

[57] ABSTRACT

Radio signals generated from a transmitter mounted on a moving object are induced into a plurality of crossed pairs of lines and into a reference pair of parallel lines. The difference in phase between the signals induced in the crossed pairs and reference pair of lines is used precisely to identify the location of the moving object.

2 Claims, 7 Drawing Figures

DETECTION SYSTEM FOR THE LOCATION OF MOVING OBJECTS

BACKGROUND OF THE INVENTION

1. Field of the Invention

This invention relates to a system for detecting the locations of a moving object by the use of inductive radio.

2. Description of the Prior Art

Location detection systems using inductive radio have been widely used for detecting locations of objects moving on a certain track such as cranes or trains, since they have no mechanical contact parts and are less disturbed by external noises.

A system for detecting locations in accordance with receiving signal levels has been utilized so far in which several pairs of lines are employed and the higher receiving signal level state and the lower receiving signal level state are encoded so as to correspond respectively to binary "1" and "0". In this system, however, satisfactory accuracy for the location detection can not be achieved because of fluctuation of receiving signal levels, for example.

SUMMARY OF THE INVENTION

The object of this invention is to overcome the foregoing defects and provide a system for detecting locations of a moving object with high accuracy. The present invention is a system for detecting absolute address location of a moving object by the use of inductive radio, comparing the phase of the signals which are transmitted from the moving object and induced in crossing pairs of lines with that of the signal which is transmitted from the moving object and induced in a reference pair of lines.

BRIEF DESCRIPTION OF THE ACCOMPANYING DRAWINGS

FIG. 6 (b) is a graphical representation showing the relation of the locations of the moving object to the amount of phase shift (curve $a_7$), compared with the relation obtained in the embodiment of FIG. 4 (curve $a_6$)

PREFERRED EMBODIMENTS OF THE INVENTION

This invention will be described in detail referring to the accompanying drawing.

Figure 1:
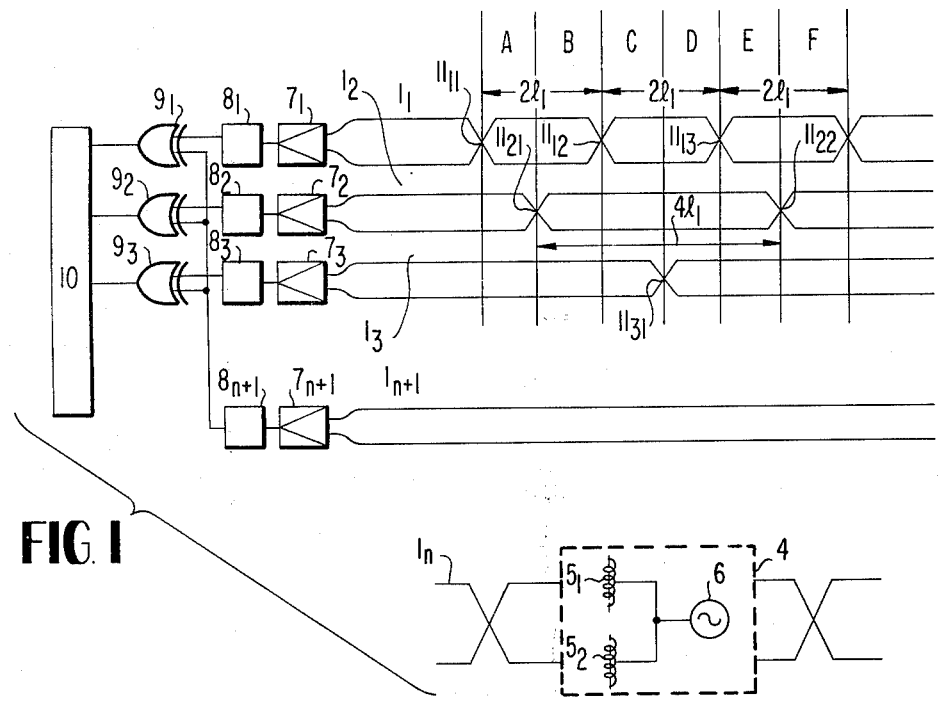
FIG. 1 is a schematic diagram showing one embodiment of the invention.
Figure 2:
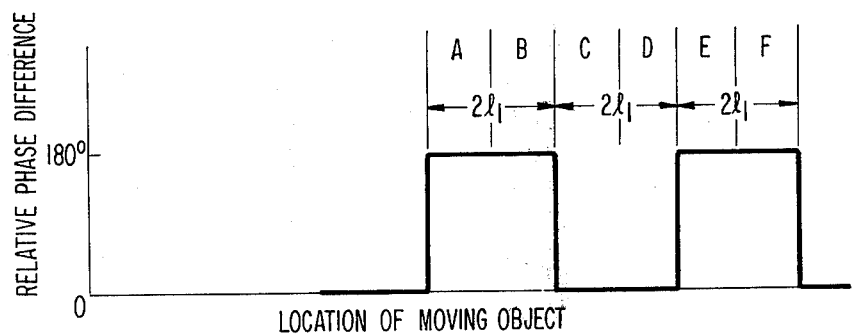
FIG. 2 is a chart showing the relation between the locations of the moving object (on abscissa) and relative phase difference (on ordinate) received on one crossing pair of lines in the system shown in FIG. 1.

FIG. 1 shows a preferred embodiment of this invention and letters A, B, C, D, E, F, . . . denote addresses located in the direction along which the object moves. The length of each address is represented as $l_1$. In a pair of lines $1_1$, which cross each other periodically at every $2l_1$ of length, the crossing points thereof $11_{11}$, $11_{12}$, $11_{13}$ . . . coincide respectively to the address boundaries of adjacent pairs of addresses. In another pair of lines $1_2$, which cross each other periodically at every $4l_1$ of length, the crossing points $11_{21}$, $11_{22}$, $11_{23}$, . . . respectively coincide to the address boundaries between adjacent sets of four addresses and located between said crossing points $11_{11}$ and $11_{12}$, $11_{13}$ and $11_{14}$, . . . respectively of said pair of lines $1_1$. For a further pair of lines $1_3$, which cross each other periodically at every $8l_1$ of length, the crossing points thereof $11_{31}$, $11_{32}$, $11_{33}$, . . . . . also coincide respectively to the address boundaries between adjacent sets of eight addresses and located between said crossing points of $11_{21}$ and $11_{22}$, $11_{23}$ and $11_{24}$, . . . respectively.

Thus, $n$ pairs of crossing lines are used, each pair of lines has a crossing period of $2^n \times l_1$, the crossing points in each of the pairs of lines coincide to the location of the address boundaries of every $2^n$ addresses, and they coincide to the locations between the crossing points of the $(n-1)$th pair of lines $1_{n-1}$.

In addition to such $n$ pairs of lines crossing each other, a parallel pair of lines $1_{n+1}$ having no crossings are provided.

A moving object 4 is mounted with a high frequency signal generator 6 and antennas $5_1$ and $5_2$ connected to said generator and electromagnetically coupled to said $(n+1)$ pairs of lines. Signals in the frequency range of 50 Khz – 250 Khz are usually but not necessarily used for the transmitting signals from the generator 6. Usually, coiled antennas are used for antennas $5_1$ and $5_2$ and each of the coils $5_1$ and $5_2$ is located corresponding to each of the positions of the conductors of the pair of lines.

It is of course possible to attain the performance of this invention by using only either one of said coiled antennas $5_1$ and $5_2$, or antennas having other configurations.

In the figure, are shown amplifiers $7_1$, $7_2$, $7_3$ . . . $7_n$, $7_{n+1}$ connected respectively to one end of $(n+1)$ pairs of lines $1_1$, $1_2$, $1_3$, . . . $1_n$, $1_{n+1}$, waveform shaping circuits $8_1$, $8_2$, $8_3$, . . . $8_n$, $8_{n+1}$ connected respectively to each of said amplifiers, $n$ exclusive OR circuits $9_1$, $9_2$, $9_3$, . . . $9_n$ connected to each of said waveform shaping circuits and a register 10 connected to said exclusive OR circuits and storing $n$ bits of information.

High frequency signals from the generator 6 mounted on the moving object are induced in each of the $(n+1)$ pairs of lines through the antennas 5. The signals induced in the parallel pairs of lines $1_{n+1}$ and transmitted to the amplifier $7_{n+1}$ are represented by the following formula:

$$T_1(z) = P_o e^{-j\beta z} \tag{1}$$

in which $P_o$ represents the amplitude, $\beta$ is a phase constant and $z$ represents a distance along the direction of the moving object.

The signals induced in the pair of lines $1_1$ and transmitted to the amplifier $7_1$ shown in FIG. 1 are represented by the formula:

$$T_1(z) = P_o e^{-j\beta z} \times e^{j\frac{\pi}{2e_1}z} = P_o e^{-j\left(\beta - \frac{\pi}{2e_1}\right)z} \tag{2}$$

It can be seen from the comparison of the formulas (1) and (2) that the terms regarding the phase in each of the formulas are $\beta Z$ and $\beta Z - \pi/2 l_1 Z$ line and the difference between their phases changes by $\pi$, that is 180°, every time the antennas of the moving object pass through the crossing points of the pair of conductor lines $1_1$. Accordingly, the difference between the phase of the signals in the pair of lines $1_1$ and that of the parallel pair in lin $1_{n+1}$ at the ends of the pairs of lines is zero when the antennas of the moving object are situated at the left of the address A and is 180° when the antennas are situated at addresses A and B. In the same way, the difference in the phase again is zero when the antennas are situated at addresses C and D and is 180° at addresses E and F.

Referring now to the difference in the phase of the received signals at the ends of the crossing pair of lines $1_2$ and the parallel pair of lines $1_{n+1}$, it quite similarly becomes zero when the antennas are situated at the left of and on the address A and becomes 180° when the antennas are situated at each of the addresses B, C, D and E, and becomes again zero when they are situated behind the address F. In this way, the phase difference of the received signal at the end of each of the $n$-th crossing pair of lines and one parallel pair of lines alternatively takes the values of zero and 180° at every crossing point.

The phase differences of zero and 180° respectively correspond to binary numbers "0" and "1" as shown in table 1 and each address is represented by the binary gray code.

TABLE 1

|  |  | A | B | C | D | E | F |  |
|---|---|---|---|---|---|---|---|---|
| Pair of lines | $1_1$ | 0 | 1 | 1 | 0 | 0 | 1 | 1 | 0 |
| " | $1_2$ | 0 | 0 | 1 | 1 | 1 | 1 | 0 | 0 |
| " | $1_3$ | 0 | 0 | 0 | 0 | 1 | 1 | 1 | 1 |
| . |  |  |  |  |  |  |  |  |
| " | $1_n$ |  |  |  |  |  |  |  |

Figure 3:
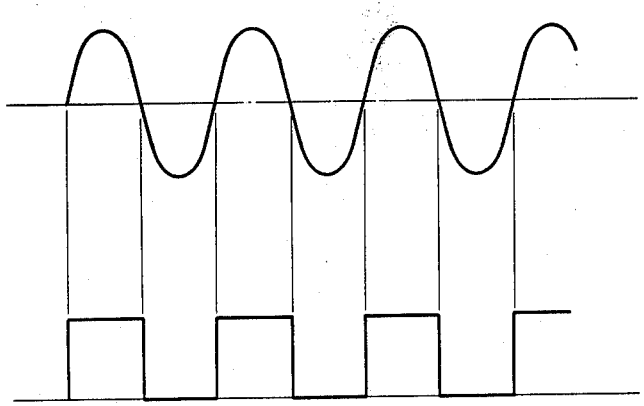
FIG. 3 is a chart showing the waveform shaping performed in the system of the invention.

The signals received at the end of each pair of lines are amplified through the amplifier circuits $7_1, 7_2, \ldots 7_n, 7_{n+1}$ and, thereafter, converted from the sinusoidal into square waveform as shown in FIG. 3 by way of the waveform shaping circuits $8_1, 8_2, \ldots 8_n, 8_{n+1}$.

When the output signals from the waveform shaping circuit $8_{n+1}$ and those from each of the waveform shaping circuits $8_1, 8_2, \ldots 8_n$ are inputted to the exclusive-OR circuits $9_1, 9_2, \ldots 9_n$, the output level of the exclusive-OR circuits becomes a high level if the two input signals are in the same phase (zero phase difference) and becomes a low level if they are in the opposite phase (180° phase difference).

The register connected with $n$ exclusive-OR circuits stores the signals of binary "0" or high level information, and binary "1" or low level information, and the address at which the moving object is present can be identified by the contents of the register.

Figure 4:
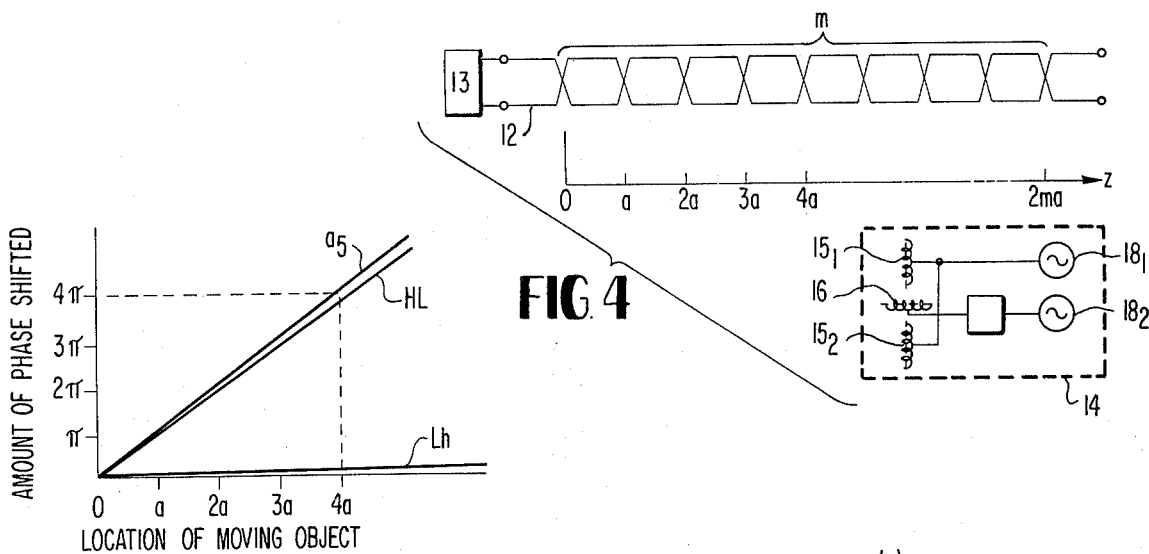
FIG. 4 is a schematic diagram showing another embodiment of the invention.

Referring now to another example of this invention in FIG. 4, reference numeral 12 denotes a pair of lines periodically crossed at a fundamental crossing interval of $a$, the end of which is connected with a receiver 13. Antennas $15_1$ and $15_2$ mounted on a moving object 14 are connected to a transmitter $18_1$ and arranged perpendicular to the line 12 and an antenna 16 is arranged in parallel with said lines 12 and connected to another transmitter $18_2$ via a phase shifter 17 which shifts the phase in an amount of 90°. When the moving object 14 travels along the pair of lines 12, the coupling between the antennas $15_1$ and $15_2$ and the pair of lines disappears instantaneously at the crossing points of lines, and the signal level repeats the substantially sinusoidal change along the lines. The coupling between the antenna 16 and the pair of lines provides the maximum signal level at the crossing points of the pair of lines 12 and disappears at the midpoint between adjacent crossing points thereby repeating the sinusoidal change in a similar way.

Figure 5:
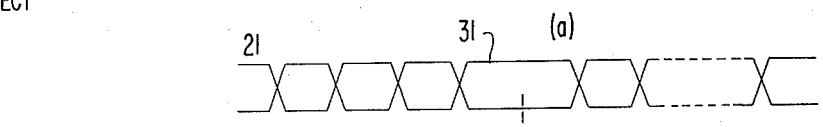
FIG. 5 is a graphical representation showing the relation of the locations of the moving object (on abscissa) to the amount of phase shift (on ordinate)

Therefore, when the signals induced from the antennas $15_1$ and $15_2$ and signal induced from the antenna 16 are added to one another and simultaneously received by the receiver 13, a constant signal level can be attained irrespective of the locations of the antennas, and the relative phase of the signal continously varies depending on the locations of the antenna as shown in FIG. 5.

Figure 6:
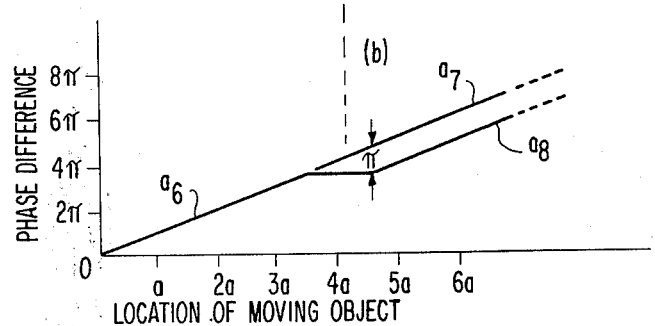
FIG. 6 (a) is a schematic diagram showing the principle of still another embodiment of the invention.

FIG. 6 ($b$) shows change of the phase value, relative to the locations of the moving object when any one of the crossing points is eliminated from the pair of lines 12 in FIG. 4 to form a parallel portion.

When comparing a curve $a_6$ representing the changes in phase for this case with a curve $a_7$ showing those for the embodiment in FIG. 4 in which no crossing points are eliminated, it can be seen that the curve $a_7$ shifts in phase below the curve $a_6$ by the amount of $\pi$ in the vicinity of the location $4a$ for the moving object, because no phase changes are produced in the parallel portion due to the lack of crossing points.

Based on the foregoing, it is possible to eliminate the crossing points in pair of lines $2_1$ 12 at any desired position and to render the portion parallel thereby varying the phase by 180° and identifying the location by detecting the variation.

Figure 7:
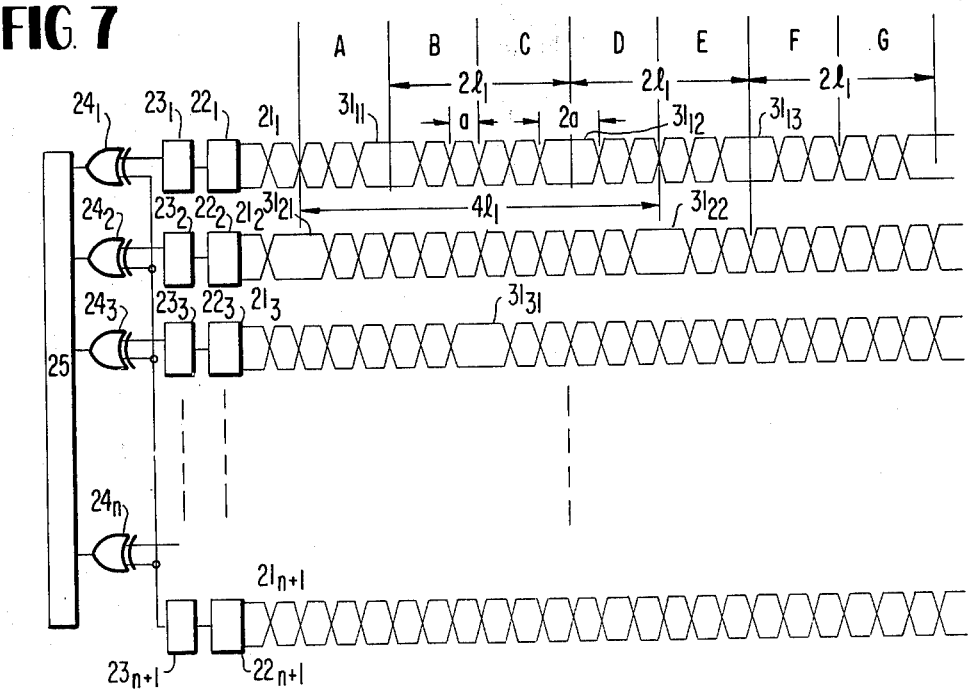
FIG. 7 is a schematic diagram showing further embodiment of the invention.

FIG. 7 is an schematic view for illustrating the construction of the embodiment of this invention based on the foregoing principle, wherein a pair of lines $21_{(n+1)}$ intersect at a fundamental crossing interval of $a$ and absolute addresses are constituted with section A, B, C, ... having length of $l_1$ and including a plurality of said fundamental crossing intervals $a$. The pair of lines $21_1$ are formed by preparing parallel sections $31_{11}, 31_{12}, 31_{13} \ldots$ by eliminating the crossing points from the address boundaries of every length of $2l_1$. Then, a pair of lines $21_2$ are formed as in the case of the pair of lines $21_1$ by preparing parallel sections $31_{21}, 31_{22} \ldots$ by eliminating the crossing point at every interval of $4l_1$. The relation between the pair lines $21_1$ and $21_2$ is kept in such a way that the parallel section of the latter, for example, $31_{22}$ lies between the parallel sections, for example $31_{12}$ and $31_{13}$, of the former.

Generally, the $n$-th pair of lines $21_n$ has crossing points on every fundamental crossing interval of $a$ and parallel sections $31_{n1}, 31_{n2}, \ldots$ formed by eliminating said crossing points on every $2^n \cdot l_1$ with such relation to the pair of lines $21_{n-1}$ that the parallel section $31_{n1}$ is placed between the parallel sections $31_{n-1,1}$ and $31_{n-1,2}$ of the lines $21_{n-1}$.

The pair of lines $21_1 \ldots 21_n$ are respectively connected to the exclusive-OR circuits $24_1 \ldots 24_n$ by way of receiving amplifiers $22_1 \ldots 22_n$ and waveform shaping circuits $23_1 \ldots 23_n$, and the pair of line $21_{n+1}$, which provides the reference phase as indicated as a curve $a_7$ in FIG. 6 above, is connected to the exclusive-OR circuits $24_1 \ldots 24_n$ in parallel with the inputs for said respective pair of lines $21_1 \ldots 21_n$ via a receiving amplifier $22_{n+1}$ and a waveform shaping circuit $23_{n+1}$. In the figure, 25 denotes a register circuit connected to the output of the exclusive-OR circuits.

The address on which the moving object is present can be detected as follows. High frequency signals from the object on any of the sections A, B, C, . . . are induced in each of said pair of lines $21_1, \ldots 21_n$. The output signals amplified and shaped respectively by amplifiers and waveform shaping circuits are inputted to the exclusive-OR circuits $24_1 \ldots 24_n$ and are compared in phase with that of the output from the reference pair of line $21_{n+1}$ also amplified and shaped in a similar way, thereby generating a binary "0" if they are in same phase and "1" if they are in opposite phase, which are then stored in the register 25.

The embodiment shown in FIG. 7, when compared with that in FIG. 1, can reduce the difference in the phase constant between each of the pair of lines by crossing the pair of lines at a closer interval (at interval of $a$), as well as having the advantage of reducing the mutual induction coupling between each of the pairs of lines and induction from external noises. It is also possible by counting the numbers of the fundamental crossing interval $a$ to detect a finer location in each of the addresses A, B, C, . . . .

What is claimed is:

1. A system for detecting the absolute address location of a moving object by the use of inductive radio comprising;
   1. $n$ pairs of crossing pairs of lines each having crossing period of $l_1 \times 2^n$ ($n = 1, 2, 3, \ldots$) and by which all of the addresses of $2^n$ locations can be represented in a manner different with each other, the unit length of the address being $l_1$;
   2. a parallel pair of lines which is not crossed;
   3. means for generating high frequency signals mounted on the moving object;
   4. an antenna supplied with high frequency signals from said high frequency generating means and electromagnetically coupling said signals to said $n$ pairs of crossing pair of lines and one parallel pair of lines;
   5. ($n + 1$) circuits which are connected respectively to the ends of said $n$ pairs of crossing pairs of lines and said one parallel pair of lines, and receivng and amplifying high frequency signals;
   6. $n$ phase detectors which are connected to said receiving and amplifying circuits and comparing the phase of the signal received on each crossing pair of lines and that on the parallel pair of lines; and
   7. registers connected to said phase detectors and storing binary signals "1" and "0" corresponding respectively to the state in same phase or in the opposite phase; thereby comparing the phase of the signals, induced from said moving object and received by said $n$ pairs of crossing pairs of lines with that received on said one parallel pair of lines to detect the binary coded absolute address.

2. A system for detecting the absolute address locations of a moving object by the use of the inductive radio comprising;
   1. a reference crossing pair of lines crossing periodically of length $a$;
   2. $n$ pairs of crossing pairs of lines in which the crossing points with period of $a$ are eliminated at the address boundaries on every interval of $l_1 \times 2^n$ ($n = 1, 2, 3 \ldots, l_1$ = address length) and by which all of the addresses less than $2^n$ are represented in a way different from each other;
   3. means for generating high frequency signals mounted on the moving object;
   4. an antenna supplied with the high frequency signals from said high frequency signal generating means and coupling electromagnetically to said $n$ pairs of crossing pair of lines and to one reference crossing pair of lines;
   5. ($n + 1$) circuits connected respectively to the ends of said $n$ pairs of crossing pairs of lines and one reference crossing pair of lines and receiving and amplifying the high frequency signals;
   6. $n$ phase detectors connected to said receiving and amplifying circuits and comparing the phase of the signal received on one reference crossing pair of lines with that of the signal received on each of said $n$ crossing pairs; and
   7. registers connected to said phase detectors and storing the binary signals "1" or "0" corresponding to the state in the same phase or in the opposite phase respectively, thereby comparing the phase of the high frequency signals, induced from said moving object and received on said $n$ pairs of crossing pairs of lines with that received on said one reference crossing pair of lines to detect the binary coded absolute address.

* * * * *